US012479002B2

(12) United States Patent
Hung

(10) Patent No.: US 12,479,002 B2
(45) Date of Patent: Nov. 25, 2025

(54) CAULKING GUN

(71) Applicant: SIANG SYUAN FU ENTERPRISE CO., LTD., Changhua County (TW)

(72) Inventor: Chen-Hsuan Hung, Changhua County (TW)

(73) Assignee: SIANG SYUAN FU ENTERPRISE CO., LTD., Changhua County (TW)

( * ) Notice: Subject to any disclaimer, the term of this patent is extended or adjusted under 35 U.S.C. 154(b) by 208 days.

(21) Appl. No.: 18/454,337

(22) Filed: Aug. 23, 2023

(65) Prior Publication Data

US 2025/0065362 A1 Feb. 27, 2025

(51) Int. Cl.
*B05C 17/00* (2006.01)
*B05C 17/005* (2006.01)
*B05C 17/01* (2006.01)

(52) U.S. Cl.
CPC .... *B05C 17/00553* (2013.01); *B05C 17/0133* (2013.01)

(58) Field of Classification Search
CPC .......... B05C 17/00553; B05C 17/0133; B05C 17/0126
See application file for complete search history.

(56) References Cited

U.S. PATENT DOCUMENTS 3,767,085 A * 10/1973 Cannon ............. B05C 17/00566 604/82
5,064,098 A * 11/1991 Hutter, III ............. B05C 17/015 222/137
5,104,005 A * 4/1992 Schneider, Jr. ... B05C 17/00553 222/137
5,381,931 A * 1/1995 Chang ..................... B05C 17/01 222/391
5,755,362 A * 5/1998 Rodriguez, Jr. ......... A61C 5/64 222/391
5,875,928 A * 3/1999 Muller .............. B05C 17/00586 222/137
6,123,235 A * 9/2000 Hsu ..................... B05C 17/0103 192/69.7
6,540,113 B2 * 4/2003 Gardos ............... B05C 17/0103 222/326
8,192,198 B2 * 6/2012 An ....................... A61C 9/0026 604/191
9,700,913 B2 * 7/2017 Hung ................ B05C 17/00596
10,668,498 B1 * 6/2020 Hung ................ B05C 17/00596
11,253,887 B1 * 2/2022 Hung .................. B05C 17/0123
11,517,935 B1 * 12/2022 Li ....................... B05C 17/0126
(Continued)

*Primary Examiner* — Vishal Pancholi
(74) *Attorney, Agent, or Firm* — MUNCY, GEISSLER, OLDS & LOWE, P.C.

(57) ABSTRACT

A caulking gun includes is provided, including: a gun body, a cartridge sleeve, two push rods, a driving member, a lever and a switch mechanism. The cartridge sleeve is rotatably connected to the gun body and configured to receive two sealants. The two push rods are movably disposed on the gun body. The driving member is movably disposed on the gun body and drives the two push rods to move. The lever is swingably disposed on the gun body about a pivot center and includes an abutting portion which is abuttable against the driving member. The switch mechanism is disposed between the gun body and the lever and includes a switch member being movable between a first position and a second position.

10 Claims, 10 Drawing Sheets

(56) References Cited

U.S. PATENT DOCUMENTS

| | | | | |
|---|---|---|---|---|
| 2002/0130141 | A1* | 9/2002 | Gardos | B05C 17/0103<br>222/144 |
| 2016/0199872 | A1* | 7/2016 | Hung | B05C 17/00596<br>222/326 |
| 2016/0288160 | A1* | 10/2016 | Hung | B05C 17/0123 |
| 2016/0288162 | A1* | 10/2016 | Hung | B05C 17/00576 |
| 2017/0165707 | A1* | 6/2017 | Hung | B05C 17/00596 |
| 2017/0291190 | A1* | 10/2017 | Hung | B05C 17/01 |
| 2018/0318870 | A1* | 11/2018 | Hung | B05C 17/00506 |

* cited by examiner

CAULKING GUN

BACKGROUND OF THE INVENTION

Field of the Invention

The present invention relates to a caulking gun.

Description of the Prior Art

A conventional dual-cartridge caulking gun includes two push rods arranged in parallel, and a lever of the dual-cartridge caulking gun is pressed to drive the two push rods to synchronously squeeze two sealants with different components, which allows the two sealants to be mixed in a predetermined ratio and solidify as desired. The sealants with different compositions have different fluidity and viscosity, and the force required to squeeze the sealants is different. However, when the lever of the conventional dual-cartridge caulking gun is pressed, the lever can only generated a fixed torque to drive the two push rods to move, and the torque cannot be adjusted to meet different requirements, which causes problems such as incorrect ratio of the two sealants, or incorrect squeezing amounts of the two sealants. In addition, the cartridge sleeve of the conventional dual-cartridge caulking gun has a complicated structure, a large volume and a heavy weight and is inconvenient to operate.

The present invention is, therefore, arisen to obviate or at least mitigate the above-mentioned disadvantages.

SUMMARY OF THE INVENTION

The main object of the present invention is to provide a caulking gun, which is convenient to replace sealants, and a torque generated by a lever of the caulking gun is adjustable.

To achieve the above and other objects, the present invention provides a caulking gun, including: a gun body, a cartridge sleeve, two push rods, a driving member, a lever and a switch mechanism. The cartridge sleeve is swingably connected to the gun body and configured to receive two sealants. The two push rods are disposed on the gun body and are movable in a moving direction to squeeze the two sealants. The driving member is movably disposed on the gun body and drives the two push rods to move. The lever is disposed on the gun body and is swingable about a pivot center, and the lever includes an abutting portion which is abuttable against the driving member. The switch mechanism is disposed between the gun body and the lever and includes a switch member being movable between a first position and a second position relative to the gun body. When the switch member is in the first position, the abutting portion generates a first torque to urge the driving member; when the switch member is in the second position, the abutting portion generates a second torque different from the first torque to urge the driving member.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
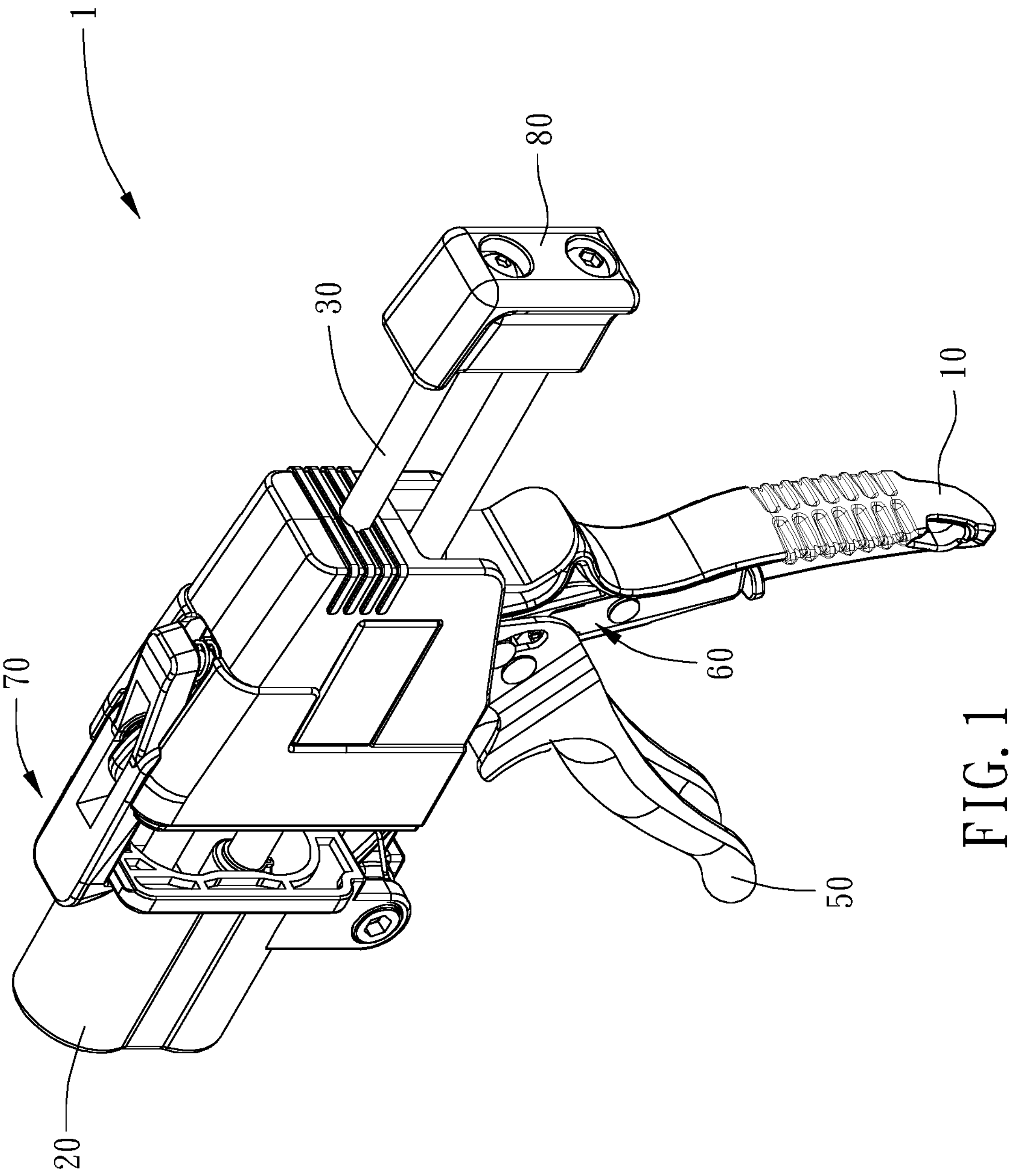
FIG. 1 is a stereogram of a preferable embodiment of the present invention.

Please refer to FIGS. 1 to 10 for a preferable embodiment of the present invention. A caulking gun 1 of the present invention includes a gun body 10, a cartridge sleeve 20, two push rods 30, a driving member 40, a lever 50 and a switch mechanism 60.

The cartridge sleeve 20 is swingably connected to the gun body 10 and configured to receive two sealants (the two sealants may be two separate bottles or be combined into a pair). The two push rods 30 are disposed on the gun body 10 and are movable in a moving direction P to squeeze the two sealants. The driving member 40 is movably disposed on the gun body 10 and drives the two push rods 30 to move. The lever 50 is disposed on the gun body 10 and is swingable about a pivot center R1, and the lever 50 includes an abutting portion 51 which is abuttable against the driving member 40. The switch mechanism 60 is disposed between the gun body 10 and the lever 50 and includes a switch member 61 being movable between a first position and a second position relative to the gun body 10. When the switch member 61 is in the first position and the lever 50 is actuated, the abutting portion 51 generates a first torque to urge the driving member 40; when the switch member 61 is in the second position and the lever 50 is actuated, the abutting portion 51 generates a second torque different from the first torque to urge the driving member 40. Therefore, the cartridge sleeve 20 is convenient to replace the two sealants, and a force that the abutting portion 51 urging the driving member 40 to move is changeable, and a force or a distance that the two push rods 30 pushing the two sealants is adjustable according to properties of the two sealants.

Figure 2:
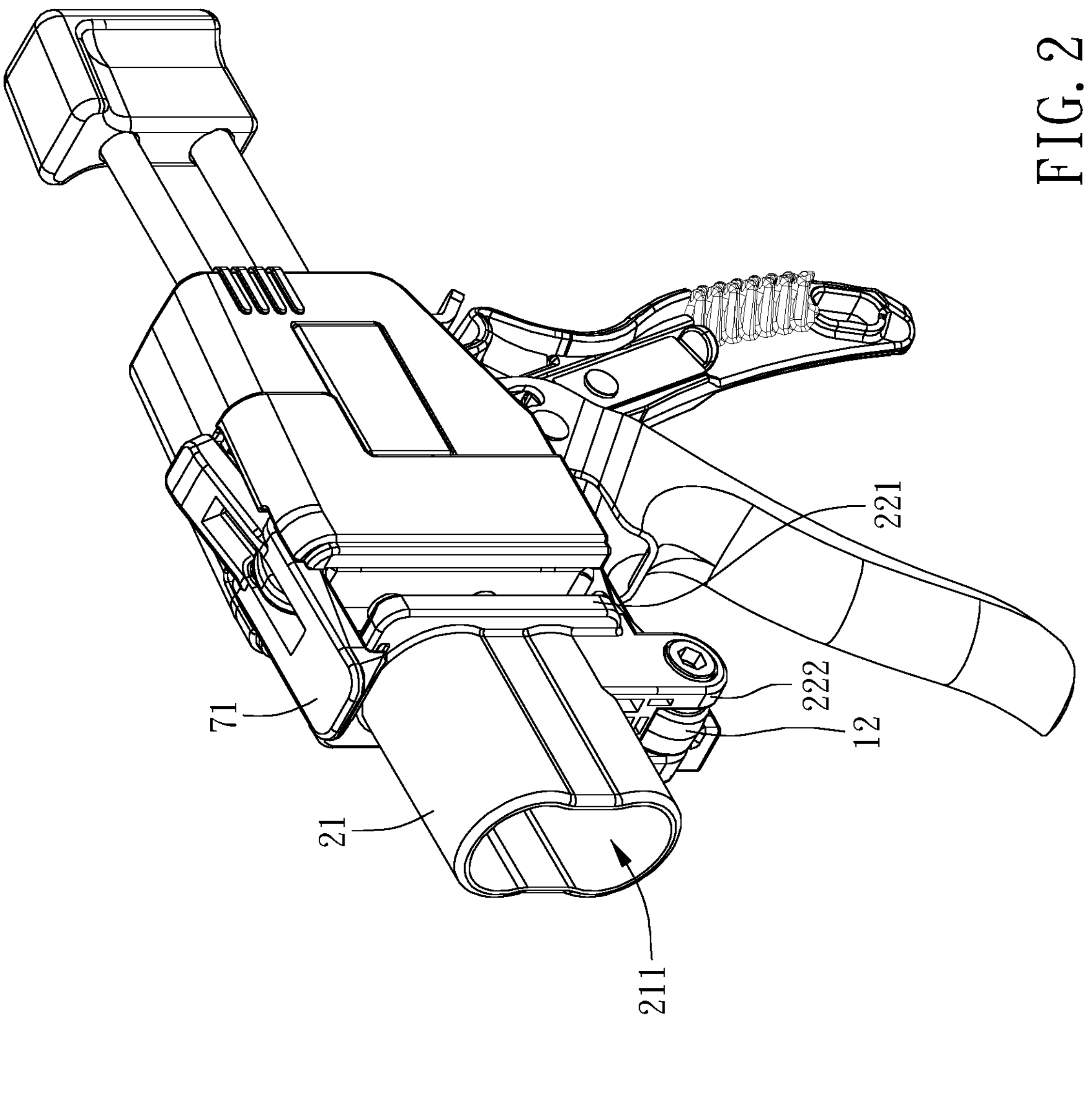
FIG. 2 is a stereogram of a preferable embodiment of the present invention as viewed in another perspective.
Figure 3:
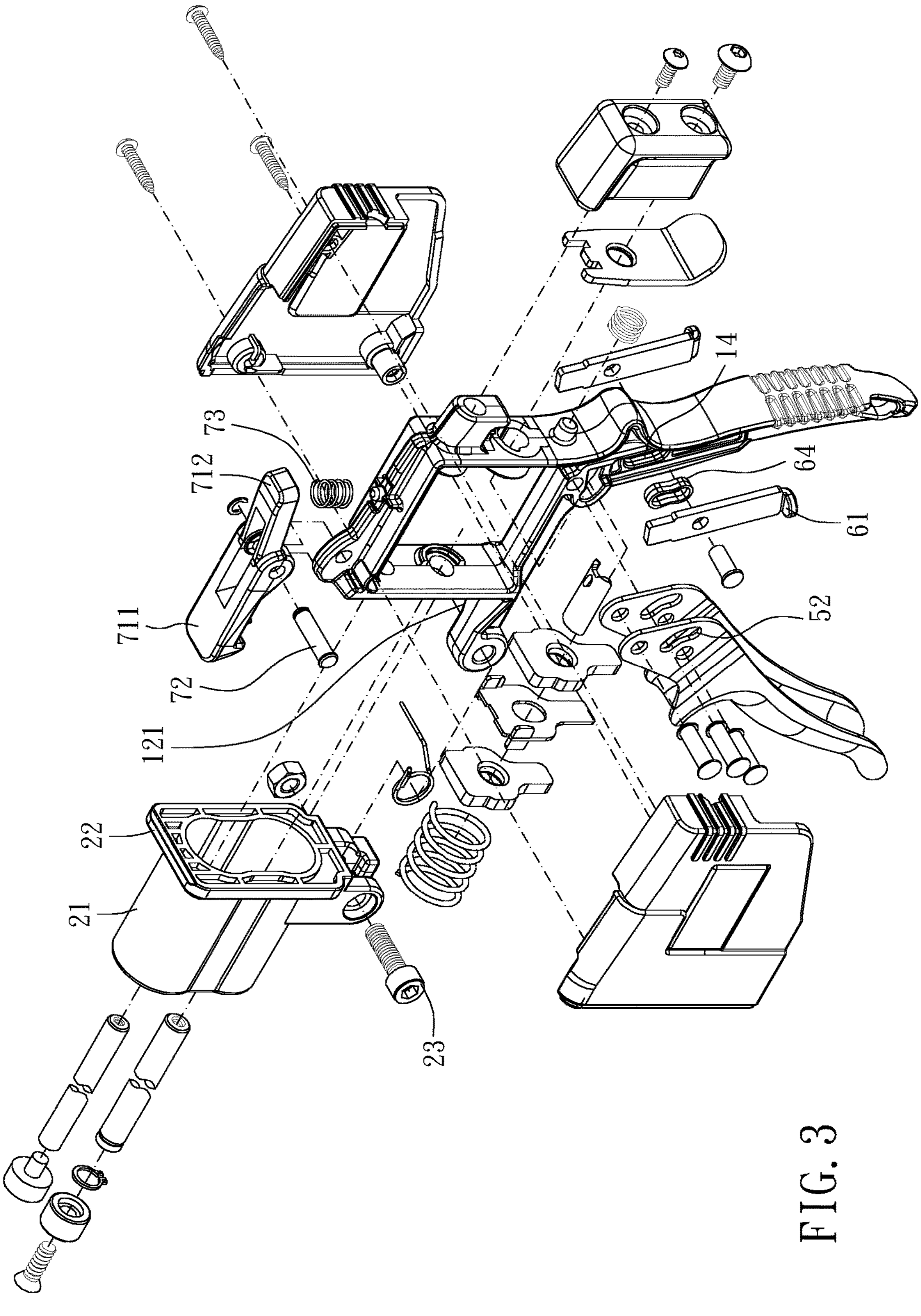
FIG. 3 is a breakdown drawing of a preferable embodiment of the present invention.
Figure 4:
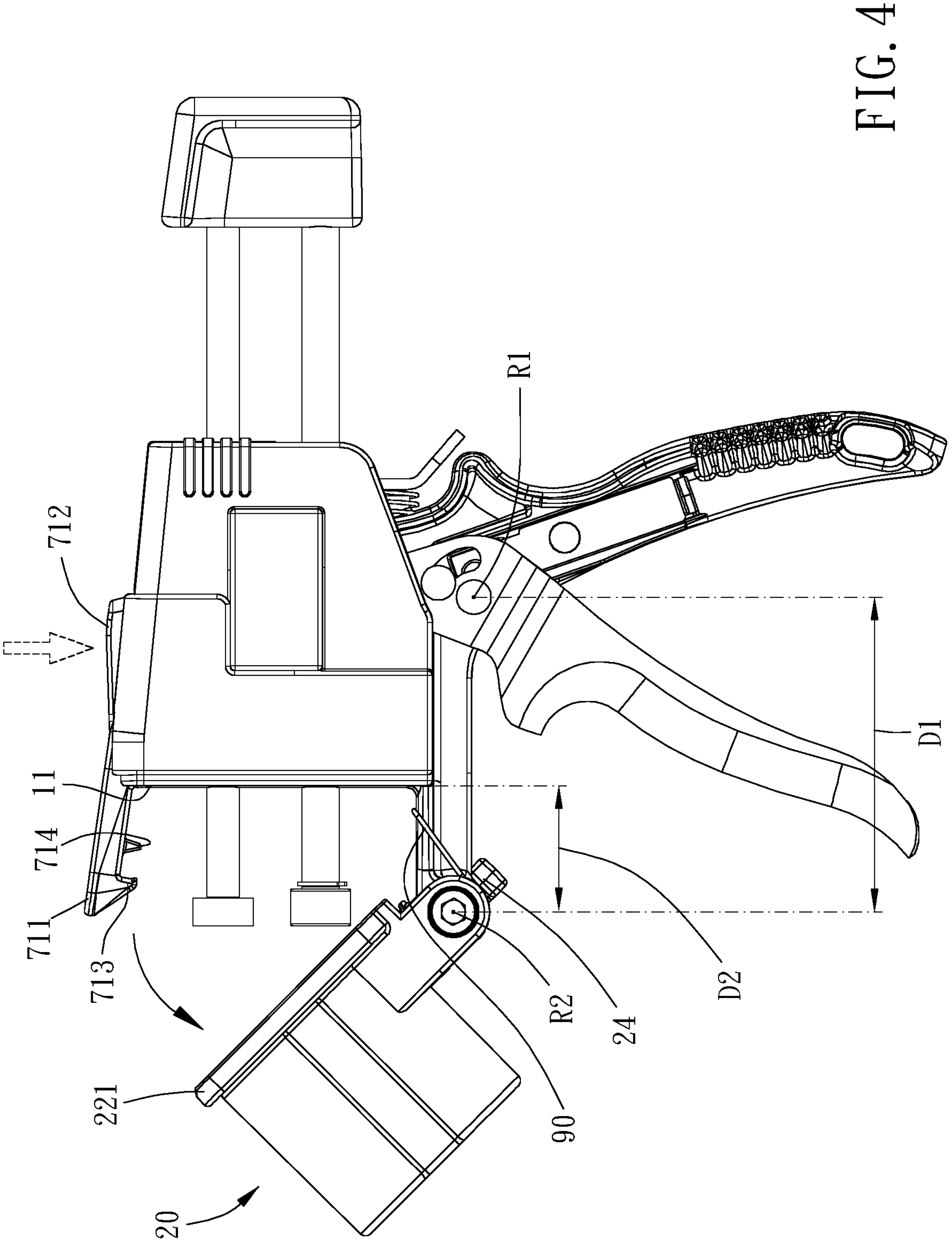
FIG. 4 is a drawing showing operation according to a preferable embodiment of the present invention.
Figure 5:
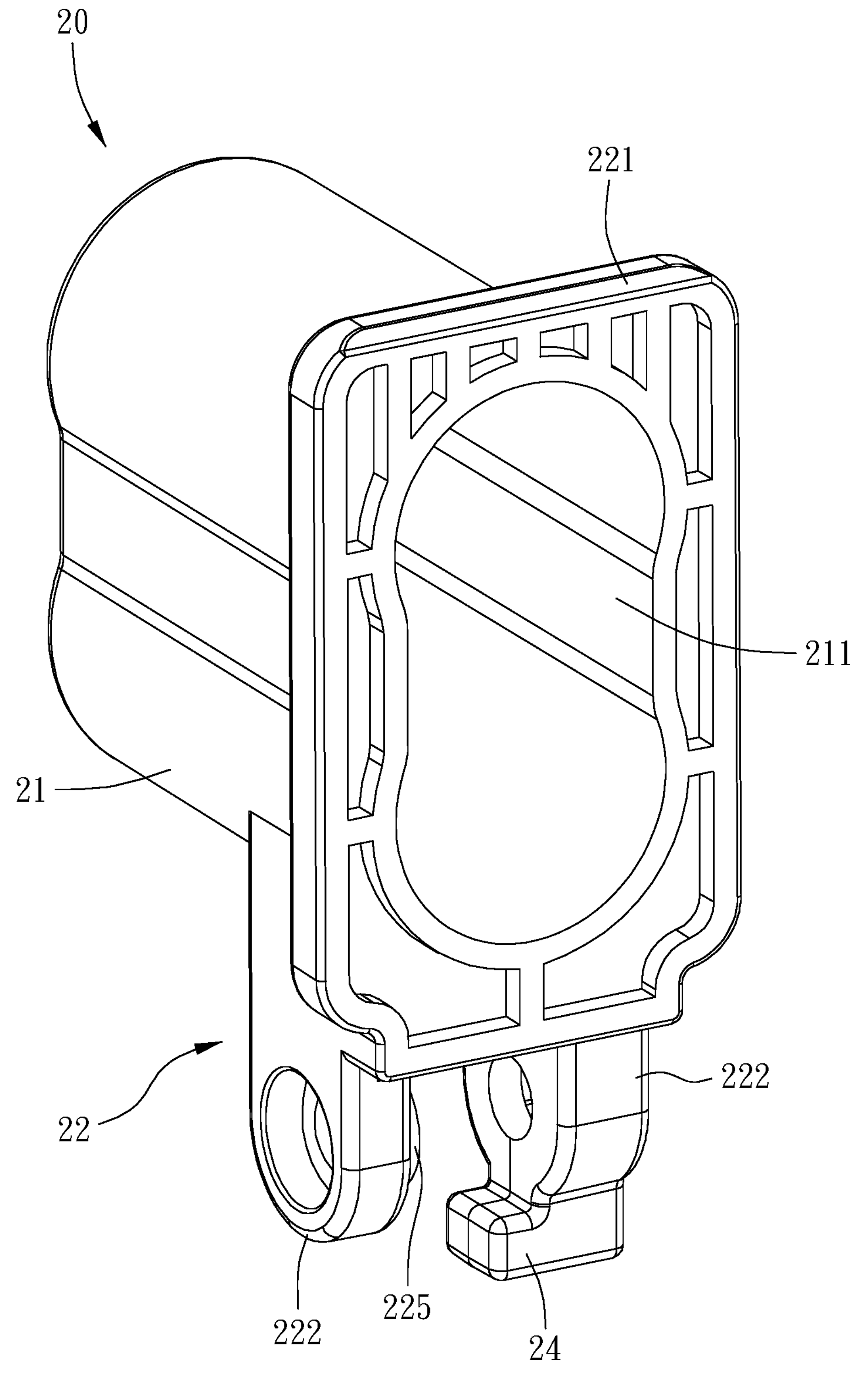
FIG. 5 is a stereogram of a cartridge sleeve according to a preferable embodiment of the present invention.
Figure 6:
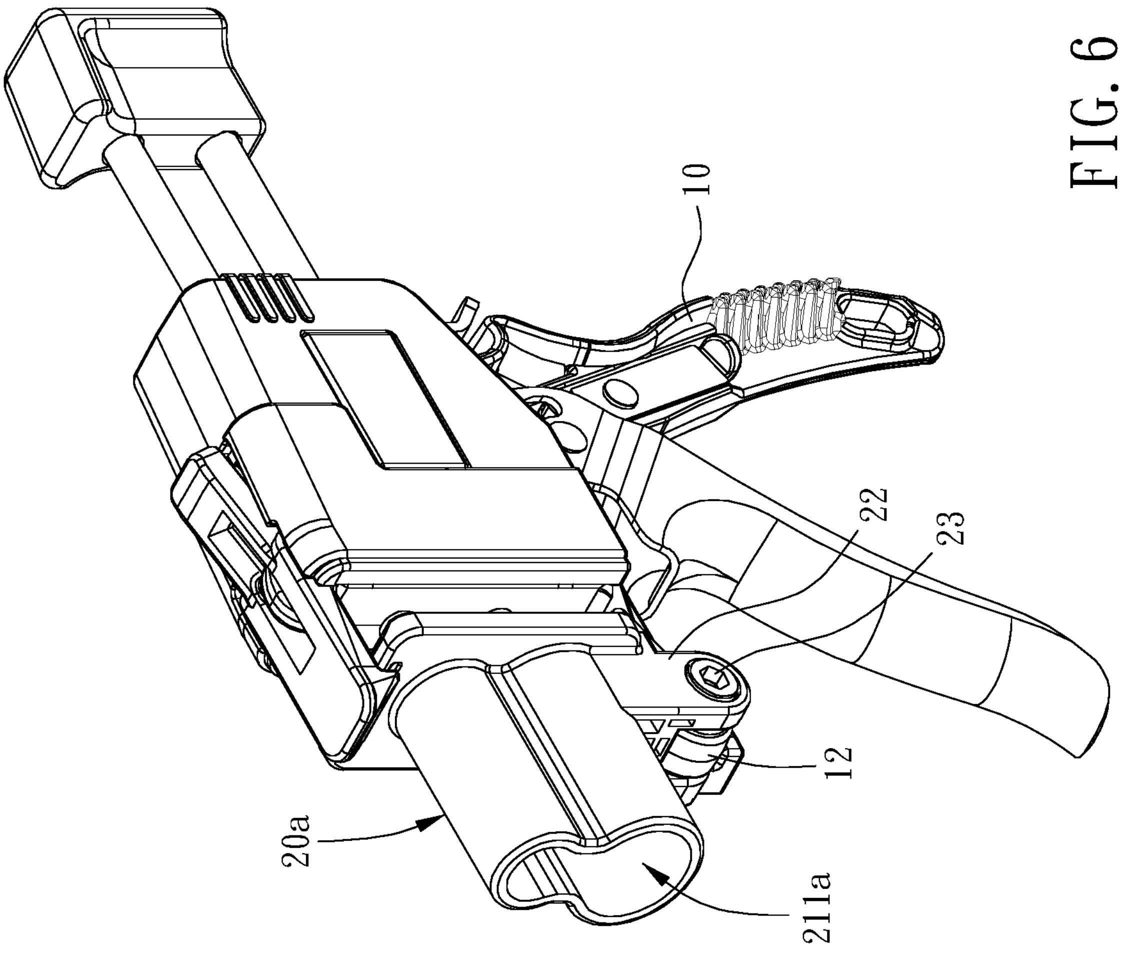
FIG. 6 is a schematic diagram of a preferable embodiment of the present invention with another cartridge sleeve.

The gun body 10 includes an end surface 11 facing toward the cartridge sleeve 20 and an extending arm 12 extending from the end surface 11 in a direction remote from the driving member 40, and the two push rods 30 are disposed through the end surface 11. The extending arm 12 is located at a side of the two push rods 30 in a radial direction lateral to the moving direction P, and the cartridge sleeve 20 is swingably connected with the extending arm 12. In the moving direction P, the end surface 11 and the cartridge sleeve 20 define a gap G therebetween. Therefore, the cartridge sleeve 20 is smoothly swung, and the gap G is configured to receive a head portion of the two sealants, which provides a wide application range. Specifically, the cartridge sleeve 20 includes a barrel portion 21 and a connecting portion 22 radially protruding from the barrel portion 21, and the barrel portion 21 defines a receiving hole 211 configured to receive the two sealants. The connecting portion 22 is detachably connected with the gun body 10 by a first pin member 23 so that the cartridge sleeve 20 can be replaced quickly to assemble another two sealants of different size. For example, as shown in FIG. 2, the receiving hole 211 of the cartridge sleeve 20 is configured to be assembled with two sealants with the same diameter; as shown in FIG. 6, the receiving hole 211*a* of the cartridge sleeve 20*a* is configured to be assembled with two sealants with different diameters. In this embodiment, the connecting portion 22 includes a flange 221 surrounding the barrel portion 21 and two protruding ears 222 connected with the flange 221, and the extending arm 12 is disposed between the two protruding ears 222; the first pin member 23 is a screw rod and is disposed through the two protruding ears 222 and the extending arm 12 for good assembling stability, good structural strength and easy assembling and disassembling. Preferably, at least one of the two protruding ears 222 has a guiding projection 225 embedded within the extending arm 12 so as to provide stable connection and smooth swinging. The connecting portion 22 further includes an abutting wall 223 connected between the two protruding ears 222, and the abutting wall 223 is abutted against the extending arm 12 in a surface contact manner so that an opening direction of the receiving hole 211 stably keeps in parallel to the moving direction P to provide stable operation.

Preferably, the extending arm 12 has a first blocking portion 121, and the cartridge sleeve 20 has a second blocking portion 24. When the cartridge sleeve 20 is swung in a direction away from the end surface 11, the first blocking portion 121 is interferingly blocked with the second blocking portion 24 in a swinging direction of the cartridge sleeve 20 so as to restrict a rotation angle of the cartridge sleeve 20 and avoid over-swinging. In this embodiment, the first blocking portion 121 is located between the end surface 11 and the first pin member 23 and is a blocking shoulder disposed on a side of the extending arm 12, and the second blocking portion 24 is a blocking projection disposed on a side of one of the two protruding ears 222 remote from the barrel portion 21. Therefore, a maximum rotation angle of the cartridge sleeve 20 relative to the end surface 11 is approximately limited to 90 degrees, which is convenient to assemble and disassemble the two sealants and provides good structural strength. Preferably, the caulking gun 1 further includes a first elastic member 90 elastically abutted against and between the connecting portion 22 and the gun body 10. In this embodiment, the first elastic member 90 is a torsion spring sleeved to the first pin member 23, which has a simple structure and is easy to assemble. When the cartridge sleeve 20 is released, the first elastic member 90 is elastically abutted against the connecting portion 22, and the cartridge sleeve 20 is automatically swung relative to the gun body 10, which is easy to operate. In other embodiments, the maximum rotation angle of the cartridge sleeve is changeable to meet different requirements; the first elastic member may be a flat spring or other elastic structures.

The caulking gun 1 further includes an engaging mechanism 70 disposed on a side of the gun body 10 remote from the lever 50, and the cartridge sleeve 20 is swingably connected to a side of the gun body 10 adjacent to the lever 50. The engaging mechanism 70 is releasably engaged with the cartridge sleeve 20 in the swinging direction of the cartridge sleeve 20, and the cartridge sleeve 20 trends to swing away from the end surface 11 due to gravity when the engaging mechanism 70 releases the cartridge sleeve 20. Specifically, the engaging mechanism 70 includes an engaging member 71, a second pin member 72 connecting the engaging member 71 with the gun body 10 and a second elastic member 73. The engaging member 71 includes a first end portion 711 and a second end portion 712 located at two opposite sides of the second pin member 72, and the first end portion 711 includes a hooked portion 713 being blockable with the connecting portion 22. The second elastic member 73 is elastically abutted against and between the second end portion 712 and the gun body 10 so that the engaging member 71 has a tendency to swing in a direction toward the first end portion 711. By pressing the second end portion 712 to compress the second elastic member 73, the hooked portion 713 is moved away from the connecting portion 22, and the cartridge sleeve 20 can be swung. Preferably, the first end portion 711 further includes a protruding portion 714 spaced apart from the hooked portion 713, and the flange 221 is engageable between the hooked portion 713 and the protruding portion 714. The flange 221 has a recession 224 disposed thereon and corresponding to the hooked portion 713, and at least a portion of the hooked portion 713 is engaged within the recession 224 for stable engagement. In the moving direction P, the engaging member 71 non-protrudes beyond the extending arm 12 so that the hooked portion 713 effectively resists a torque generated by the cartridge sleeve 20 so as to have stable engagement and avoid damage of components. As viewed in the radial direction, the second pin member 72 is located between the switch mechanism 60 and the first pin member 23, which is convenient to operate.

As viewed in the radial direction, a first distance D1 is defined between the pivot center R1 of the lever 50 and a pivot center R2 of the cartridge sleeve 20, and a second distance D2 is defined between the end surface 11 and the pivot center R2 of the cartridge sleeve 20. The second distance D2 is larger than or equal to ⅕ (preferably ¼) of the first distance D1, which ensures that the pivot center R2 of the cartridge sleeve 20 and the switch mechanism 60 keep a sufficient distance therebetween for easy and smooth operation.

Figure 7:
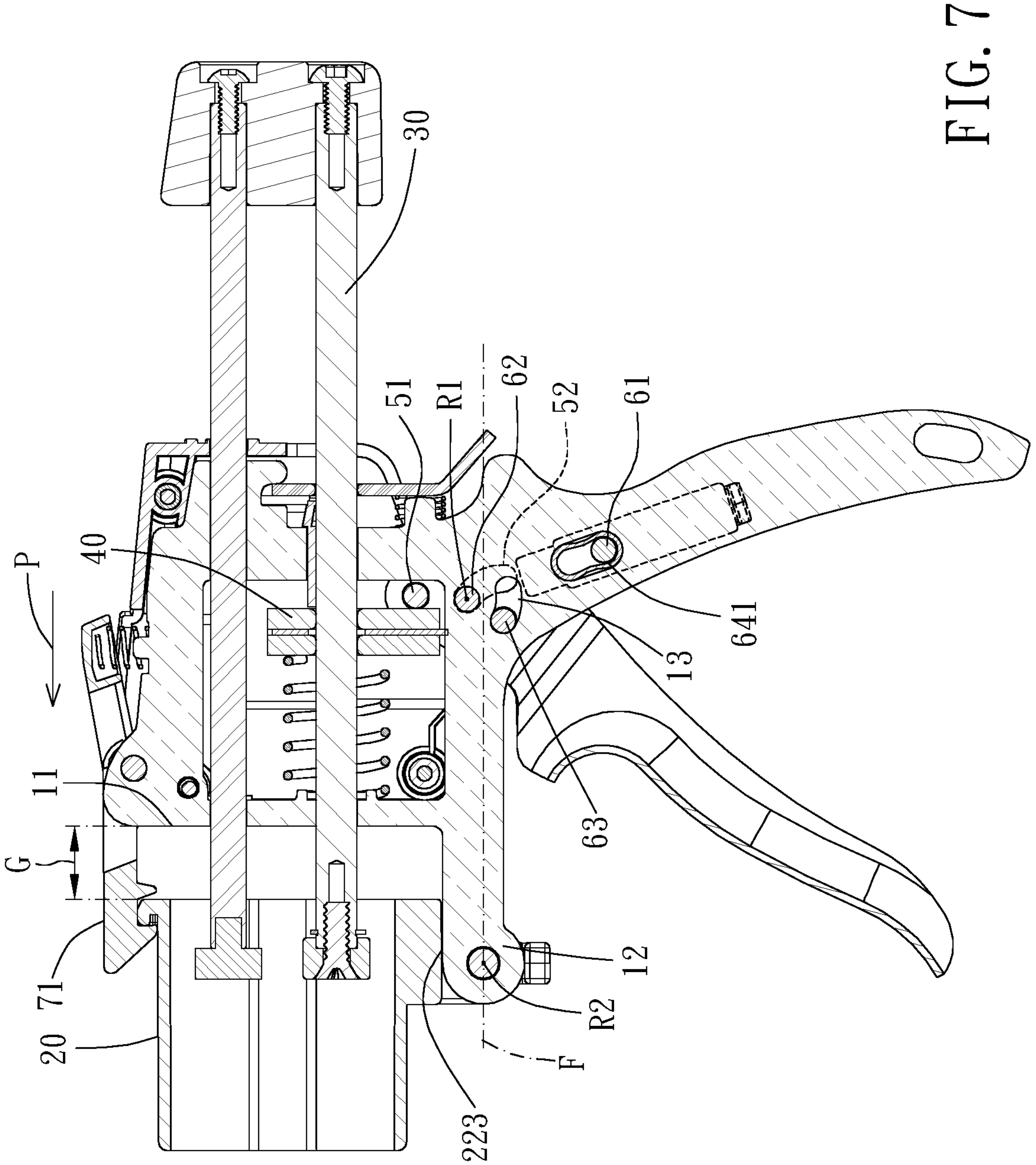
FIGS. 7 and 8 are cross sectional views showing operation of a preferable embodiment of the present invention when a switch member is in a first position.
Figure 8:
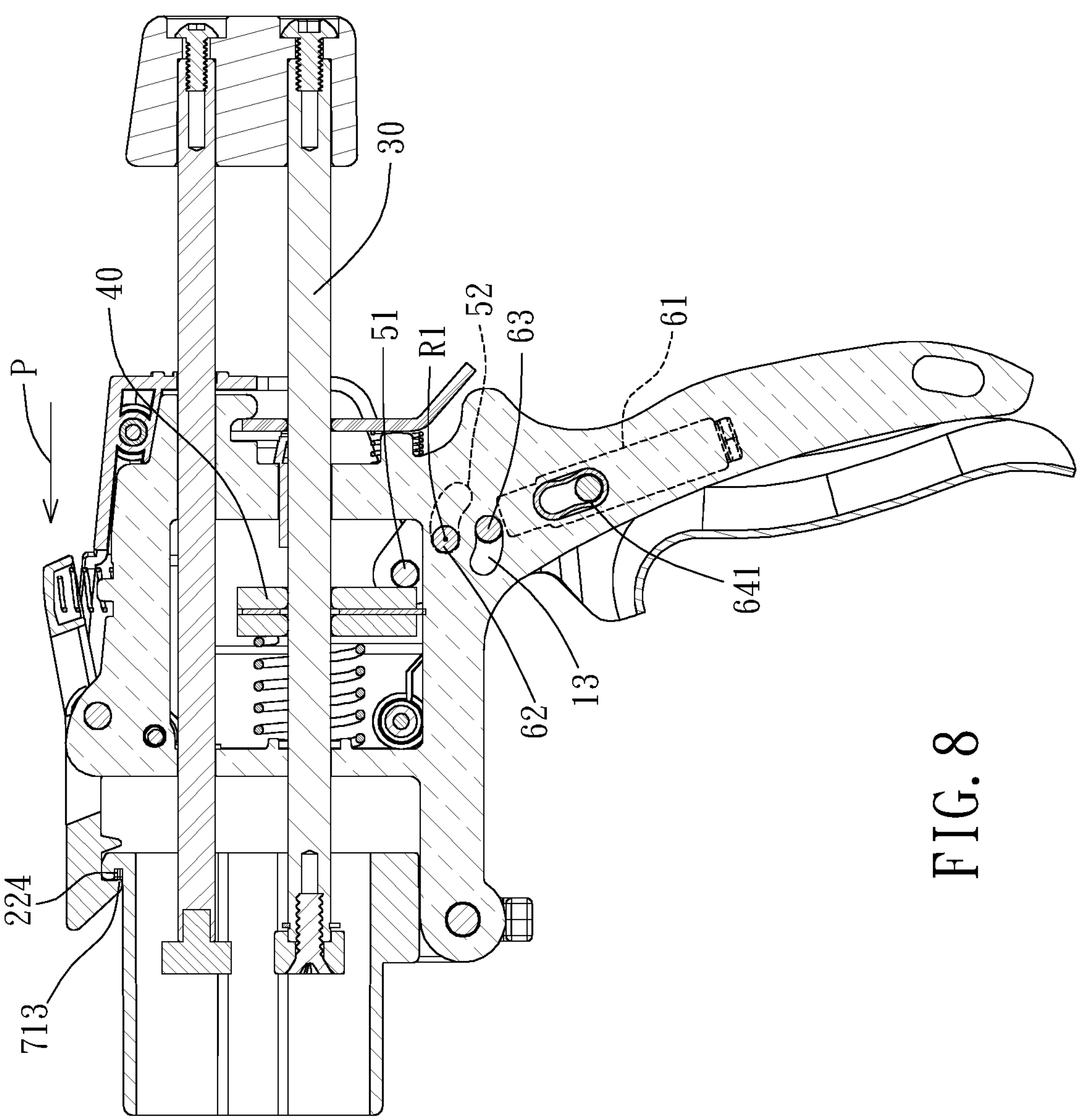

Please refer to FIGS. 7 and 8, the switch mechanism 60 further includes a first shaft 62 immovably pivoted to the gun body 10, and the first shaft 62 is disposed through a first arcuate groove 52 of the lever 50. When the switch member 61 is located in the first position, the lever 50 is swingable relative to the gun body 10 with the first shaft 62 as the pivot center R1, and the abutting portion 51 generates the first torque to urge the driving member 40.

Figure 9:
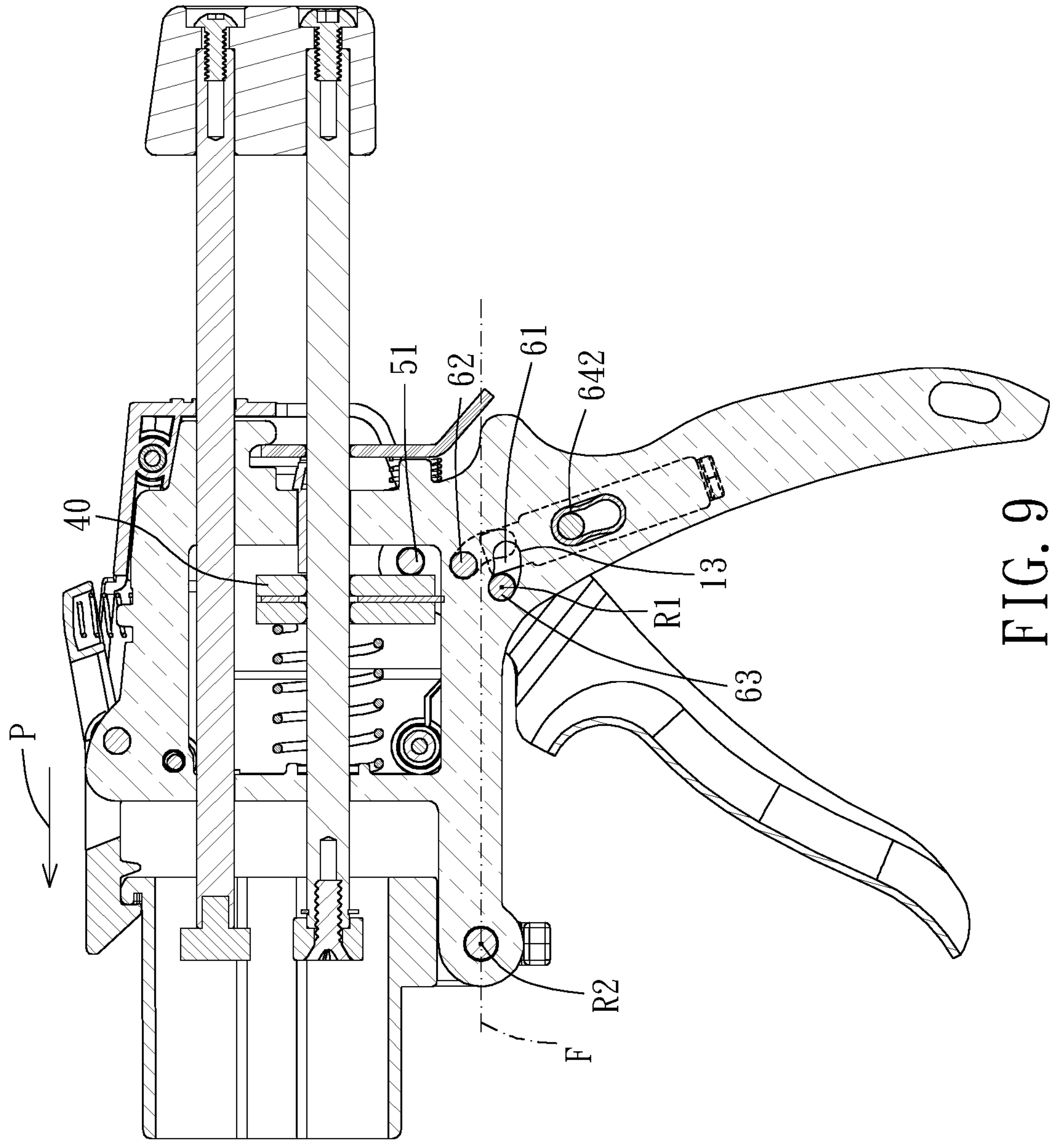
FIGS. 9 and 10 are cross sectional views showing operation of a preferable embodiment of the present invention when the switch member is in a second position.
Figure 10:
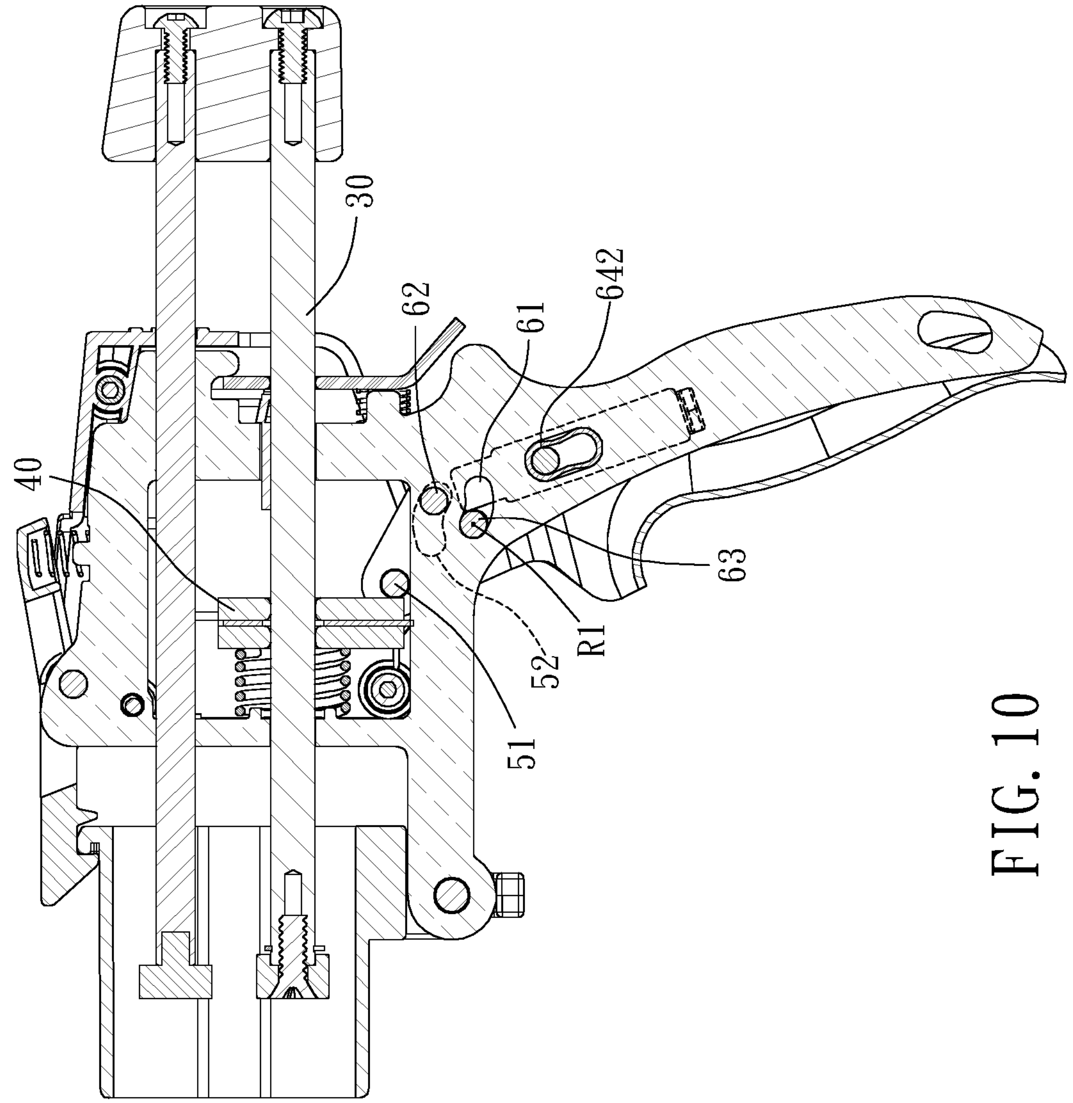

Please refer to FIGS. 9 and 10, the switch mechanism 60 further includes a second shaft 63 immovably pivoted to the lever 50, and the second shaft 63 is movably disposed through a second arcuate groove 13 of the gun body 10. When the switch member 61 is in the second position, the switch member 61 is blocked with the second shaft 63 in an extending direction of the second arcuate groove 13, the second shaft 63 is immovable relative to the gun body 10, and the lever 50 is swingable relative to the gun body 10 with the second shaft 63 as the pivot center R1. The first shaft 62 and the first arcuate groove 52 are movable relative to each other, and the abutting portion 51 generates the second torque to urge the driving member 40. When the first shaft 62 serves as the pivot center R1 of the lever 50, the abutting portion 51 has a shorter route in the moving direction P, the first torque is smaller and is suitable to squeeze the two sealants with high fluidity and low viscosity for small-amount squeezing. When the second shaft 63 serves as the pivot center R1 of the lever 50, the abutting portion 51 has a longer route in the moving direction P, the second torque is greater than the first torque and is suitable to squeeze the two sealants with low fluidity and high viscosity, which provides laborsaving effect. An operator can switch a position of the pivot center R1 by the switch member 61 so as to achieve desired squeezing effect.

In this embodiment, the two push rods 30 are arranged up and down, and the driving member 40 is directly connected with one of the two push rods 30; the caulking gun 1 further includes a connecting member 80, and the two push rods 30 are detachably connected with the connecting member 80 so that the two push rods 30 are co-movable. When the lever 50 is actuated, the two push rods 30 are moved asynchronously, one of the two sealants with lower viscosity corresponds to one of the two push rods 30 indirectly connected with the driving member 40, or the switch member 61 is operated to adjust the pushing force and/or pushing distance of the two push rods 30 so as to have desired squeezing effect. In other embodiments, the two push rods may be arranged left and right; the driving member may be directly connected with the two push rods so that the two push rods are moved synchronously to provide the same pushing force.

Specifically, an imaginary plane F passing through the pivot center R2 of the cartridge sleeve 20 and parallel to the moving direction P is defined. When the switch member 61 is moved from the first position to the second position, the pivot center R1 of the lever 50 is changed from a side of the imaginary plane F to another side of the imaginary plane F so as to provide the first torque or the second torque and good caulking effect. In this embodiment, the first arcuate groove 52 and the second arcuate groove 13 are through grooves being circumferentially closed respectively; as viewed in the radial direction, the first arcuate groove 52 and the second arcuate groove 13 are partially overlapped with each other when the lever 50 is not actuated, and the first shaft 62 is closer to the abutting portion 51 than the second shaft 63. When the lever 50 is actuated and the first shaft 62 serves as the pivot center R1, the second shaft 63 is movable along the second arcuate groove 13, and the first shaft 62 and the first arcuate groove 52 are immovable relative to each other since the lever 50 is interfered with the gun body 10 in a swinging direction of the lever 50. The lever 50 can be smoothly swung without being restricted by the switch member 61, and the switch mechanism 60 has a compact structure and a small volume.

The gun body 10 further includes an assembling hole 14, and the switch mechanism 60 further includes a positioning member 64 disposed within the assembling hole 14 and surrounding the switch member 61. The positioning member 64 is elastically deformable to restrict the switch member 61 to one of the first position and the second position, which has a simple structure and is easy to assemble. In this embodiment, the positioning member 64 includes a first positioning groove 641 and a second positioning groove 642, the first positioning groove 641 is remote from the abutting portion 51 relative to the second positioning groove 642. When the switch member 61 is located within the first positioning groove 641, the switch member 61 is free of interference with the first shaft 62 and the second shaft 63. When the switch member 61 is located within the second positioning groove 642, the switch member 61 is interfered with the second shaft 63, which has a simple structure and is easy to assemble. A moving direction of the switch member 61 is lateral to an extending direction of the second arcuate groove 13 so as to be stably blocked with the second shaft 63.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A caulking gun, including:

a gun body;

a cartridge sleeve, swingably connected to the gun body, configured to receive two sealants;

two push rods, disposed on the gun body and being movable in a moving direction to squeeze the two sealants;

a driving member, movably disposed on the gun body and driving the two push rods to move;

a lever, disposed on the gun body and being swingable about a pivot center, including an abutting portion which is abuttable against the driving member; and a switch mechanism, disposed between the gun body and the lever, including a switch member being movable between a first position and a second position relative to the gun body; when the switch member is in the first position and the lever is actuated, the abutting portion generates a first torque to urge the driving member; when the switch member is in the second position and the lever is actuated, the abutting portion generates a second torque different from the first torque to urge the driving member.

2. The caulking gun of claim 1, wherein the gun body includes an end surface facing toward the cartridge sleeve and an extending arm extending from the end surface in a direction remote from the driving member, the two push rods are disposed through the end surface, the extending arm is located at a side of the two push rods in a radial direction lateral to the moving direction, and the cartridge sleeve is swingably connected with the extending arm.

3. The caulking gun of claim 2, wherein the extending arm has a first blocking portion, the cartridge sleeve has a second blocking portion, and when the cartridge sleeve is swung in a direction away from the end surface, the first blocking portion is interferingly blocked with the second blocking portion in a swinging direction of the cartridge sleeve.

4. The caulking gun of claim 1, wherein an imaginary plane passing through a pivot center of the cartridge sleeve and parallel to the moving direction is defined, when the switch member is moved from the first position to the second position, the pivot center of the lever is changed from a side of the imaginary plane to another side of the imaginary plane.

5. The caulking gun of claim 1, further including an engaging mechanism disposed on a side of the gun body remote from the lever, wherein the cartridge sleeve is swingably connected to a side of the gun body adjacent to the lever, and the engaging mechanism is releasably engaged with the cartridge sleeve in a swinging direction of the cartridge sleeve.

6. The caulking gun of claim 5, wherein the engaging mechanism includes an engaging member, a second pin member connecting the engaging member with the gun body and a second elastic member, the engaging member includes a first end portion and a second end portion located at two opposite sides of the second pin member, the first end portion includes a hooked portion being blockable with the cartridge sleeve, and the second elastic member is elastically abutted against and between the second end portion and the gun body so that the engaging member has a tendency to swing in a direction toward the first end portion.

7. The caulking gun of claim 1, wherein the gun body includes an end surface facing toward the cartridge sleeve, the two push rods are disposed through the end surface, as viewed in a radial direction lateral to the moving direction, a first distance is defined between the pivot center of the lever and a pivot center of the cartridge sleeve, a second distance is defined between the end surface and the pivot center of the cartridge sleeve, and the second distance is larger than or equal to ⅕ of the first distance.

8. The caulking gun of claim 1, wherein the switch mechanism further includes a first shaft immovably pivoted to the gun body, the first shaft is disposed through a first arcuate groove of the lever; and when the switch member is located in the first position, the lever is swingable relative to the gun body with the first shaft as the pivot center.

9. The caulking gun of claim 8, wherein the switch mechanism further includes a second shaft immovably pivoted to the lever, the second shaft is movably disposed through a second arcuate groove of the gun body; when the switch member is in the second position, the switch member is blocked with the second shaft in an extending direction of the second arcuate groove, the second shaft is immovable relative to the gun body, the lever is swingable relative to the gun body with the second shaft as the pivot center, and the first shaft and the first arcuate groove are movable relative to each other.

10. The caulking gun of claim 6, wherein the gun body includes an end surface facing toward the cartridge sleeve and an extending arm extending from the end surface in a direction remote from the driving member, the two push rods are disposed through the end surface, the extending arm is located at a side of the two push rods in a radial direction lateral to the moving direction, and the cartridge sleeve is swingably connected with the extending arm; in the moving direction, the end surface and the cartridge sleeve define a gap therebetween; the extending arm has a first blocking portion, the cartridge sleeve has a second blocking portion, and when the cartridge sleeve is swung in a direction away from the end surface, the first blocking portion is interferingly blocked with the second blocking portion in the swinging direction of the cartridge sleeve; an imaginary plane passing through a pivot center of the cartridge sleeve and parallel to the moving direction is defined, when the switch member is moved from the first position to the second position, the pivot center of the lever is changed from a side of the imaginary plane to another side of the imaginary plane; the cartridge sleeve includes a barrel portion and a connecting portion radially protruding from the barrel portion, the barrel portion defines a receiving hole configured to receive the two sealants, the connecting portion is detachably connected with the gun body by a first pin member; the connecting portion includes a flange surrounding the barrel portion and two protruding ears connected with the flange, the extending arm is disposed between the two protruding ears, the first pin member is a screw rod and is disposed through the two protruding ears and the extending arm; the caulking gun further includes a first elastic member elastically abutted against and between the connecting portion and the gun body, the first elastic member is a torsion spring; when the engaging mechanism is disengaged from the cartridge sleeve, the first elastic member is elastically abutted against the connecting portion and the cartridge sleeve is swung relative to the gun body; at least one of the two protruding ears has a guiding projection embedded within the extending arm; the connecting portion further includes an abutting wall connected between the two protruding ears, the abutting wall is abutted against the extending arm in a surface contact manner; the first blocking portion is located between the end surface and the first pin member and is a blocking shoulder disposed on a side of the extending arm, the second blocking portion is a blocking projection disposed on a side of one of the two protruding ears remote from the barrel portion; the flange has a recession corresponding to the hooked portion, the hooked portion is at least partially engageable within the recession; as viewed in the radial direction, a first distance is defined between the pivot center of the lever and the pivot center of the cartridge sleeve, a second distance is defined between the end surface and the pivot center of the cartridge sleeve, and the second distance is larger than or equal to ¼ of the first distance; in the moving direction, the engaging member non-protrudes beyond the extending arm; as viewed in the radial direction, the second pin member is located between the switch mechanism and the first pin member; the switch mechanism further includes a first shaft immovably pivoted to the gun body, the first shaft is disposed through a first arcuate groove of the lever; and when the switch member is located in the first position, the lever is swingable relative to the gun body with the first shaft as the pivot center; the switch mechanism further includes a second shaft immovably pivoted to the lever, the second shaft is movably disposed through a second arcuate groove of the gun body; when the switch member is in the second position, the switch member is blocked with the second shaft in an extending direction of the second arcuate groove, the second shaft is immovable relative to the gun body, the lever is swingable relative to the gun body with the second shaft as the pivot center, and the first shaft and the first arcuate groove are movable relative to each other; the first arcuate groove and the second arcuate groove are through grooves being circumferentially closed respectively; as viewed in the radial direction, the first arcuate groove and the second arcuate groove are partially overlapped with each other when the lever is not actuated, and the first shaft is closer to the abutting portion than the second shaft; when the first shaft serves as the pivot center of the lever, the second shaft is movable along the second arcuate groove, and the first shaft and the first arcuate groove are immovable relative to each other; the gun body further includes an assembling hole, the switch mechanism further includes a positioning member disposed within the assembling hole and surrounding the switch member, the positioning member is elastically deformable to restrict the switch member to one of the first position and the second position; the positioning member includes a first positioning groove and a second positioning groove, the first positioning groove is remote from the abutting portion relative to the second positioning groove; when the switch member is located within the first positioning groove, the switch member is free of interference with the first shaft and the second shaft; when the switch member is located within the second positioning groove, the switch member is interfered with the second shaft; and the caulking gun further includes a connecting member, and the two push rods are detachably connected with the connecting member.

* * * * *